May 26, 1970  R. J. HELLE  3,513,807

REAR VIEW MIRROR WITH ADJUSTMENT GUIDES

Original Filed May 25, 1965

INVENTOR.
ROBERT J. HELLE

BY ATTORNEYS

United States Patent Office 3,513,807
Patented May 26, 1970

3,513,807
REAR VIEW MIRROR WITH ADJUSTMENT GUIDES
Robert J. Helle, 371 De Leon Vista,
Crystal Lake, Ill. 60014
Original application May 25, 1965, Ser. No. 458,543, now Patent No. 3,439,646, dated Apr. 22, 1969. Divided and this application Jan. 27, 1969, Ser. No. 796,305
Int. Cl. G09f 9/00
U.S. Cl. 116—124                    8 Claims

ABSTRACT OF THE DISCLOSURE

A rearview mirror assembly has a pedestal and a mirror mounted for pivotal adjustment on the pedestal, with index means stationary with the pedestal and pointer means adjustably movable with the mirror and coactive with the index means to determine relative positions of adjustment of the mirror.

---

This application is a division of my copending application Ser. No. 458,543, filed May 25, 1965, now U.S. Pat. No. 3,439,646.

The present invention relates to rearview mirrors such as are mounted outside of, and within the line of sight of, the driver's enclosure of an automobile or truck, and is more particularly concerned with means for attaining accurate repositioning or duplication readjustment of the mirror once a preferred adjustment has been found for any given driver of the vehicle.

One of the problems in the use of these mirrors resides in that they must be adjustable for proper alignment with the line of vision of the driver. Often such a mirror is moved out of adjustment as during cleaning or by inadvertent contact during servicing of the vehicle. Further, where the same vehicle is driven by different persons it may be necessary to readjust the rearview mirror to suit the individual driver. Often by reason of the mirror being mounted at such a distance fom the driver's seat, it cannot be satisfactorily adjusted except by a second person outside of the driver's compartment, or by several cut and try attempts by the driver getting in and out of the driver's seat to make the adjustment. With conventional forms of rearview mirror, this adjustment process must be gone through every time a readjustment must be made.

According to the principles of the present invention the foregoing and other problems, disadvantages and deficiencies of prior rearview mirror arrangements are overcome by my new and improved indexing means stationary with the mirror pedestal and pointer means movable with and indicative of the relative position of the mirror.

An important object of the present invention is to provide new and improved indexing and pointer means in a rearview mirror assembly to enable substantially accurate repositioning or duplication readjustment of the mirror once a preferred adjustment has been found for any given driver of the vehicle.

Another object of the invention is to provide new and improved adjustment guiding means enabling quick readjustment of an exterior rearview mirror to a desired setting where no means are available for this purpose inside the vehicle for manipulation from the driver's seat.

Another object of the invention is to provide new and improved, simple, positive, easily understandable means for guiding the adjustment of an exteriorly mounted rearview mirror assembly for a vehicle.

Figure 1:
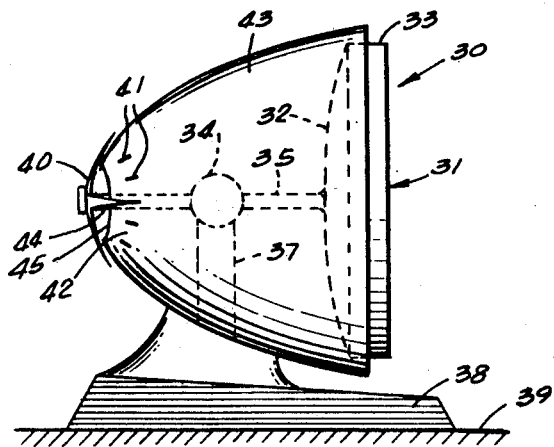
Figure 2:
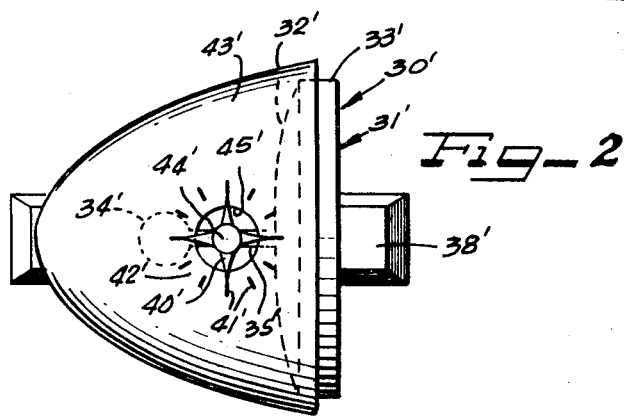
Figure 3:
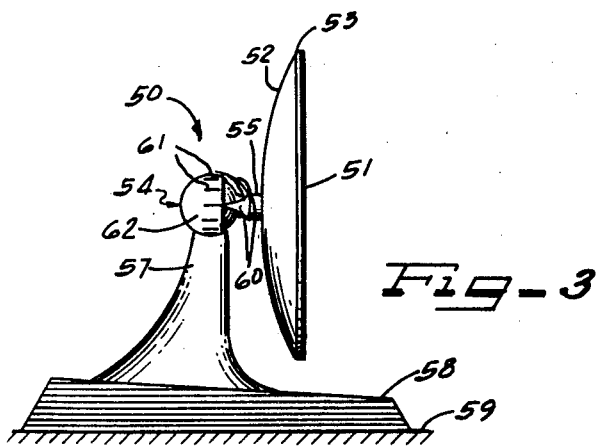

Other objects, features and advantages of the present invention will be readily apparent from the following detailed description of certain exemplary embodiments thereof taken in conjunction with the accompanying drawings, in which:

FIG. 1 is a side elevational view of a rearview mirror assembly embodying features of the invention;
FIG. 2 is a top plan view of a modification; and
FIG. 3 is a side elevational view of a further modification.

Upon reference to FIG. 1, a rearview mirror assembly 30 to which the present invention is applied comprises a mirror 31 mounted in a mirror back 32 having a mirror-embracing rim 33 and attached to a universal joint 34 on an axial stem 35. The joint 34 is supported by a pedestal 37 carried by a base 38 and adapted to be mounted fixedly on a suitable part of the vehicle exteriorly of and in line of sight of the driver's compartment of the vehicle, such as on a fender 39.

In the rearview mirror structure 30, adjustment indicating means comprise a guide pointer 40 of desirably four-pointed star shape correlated to index indicia comprising an annular series of marks 41 on a dial area 42 on a stationary support such as the smaller end of a protective housing shell 43 of streamline form tapering away from the mirror.

For coordinated adjustment movement of the guide pointer 40 with the mirror 31 to orient one of its plurality of points or fingers with one of the index marks 41, the pointer is carried by the mirror mounting stem 35 and more particularly an extension 44 thereof to the opposite side of the pivot joint 34 relative to the mirror and projecting through a suitable clearance aperture 45 in the index dial end of the housing 43. Through the arrangement any adjustment of the mirror 31 relative to the housing 43 is simultaneously indexed for ready repositioning to duplicate the adjustment.

FIG. 2 shows a variation of the form of the invention depicted in FIG. 1, and primed reference numerals indicate the same parts and description is therefore abbreviated with the understanding that the same description applies to the same parts as given for FIG. 1. In the rearview mirror assembly 30' of FIG. 2, however, the star-shaped guide pointer 40' is coactive with an index dial area 42' located on the top of the stationary housing 43' about a clearance aperture 45' through which extends a supporting stem extension 44' from the mirror supporting stem 35'. Adjustments of the mirror 31' are reflected in corresponding relative adjustments of the guide pointers 40' in respect to the index marks 41'.

FIG. 3 depicts another form of rearview mirror assembly 50 embodying the principles of the present invention, comprising a mirror 51 carried by a backing 52 having a mirror-protective rim 53 and connected to a universal pivot joint 54 by means of a central, axial stem 55. Fixed support for the joint 53 is provided by a pedestal 57 on a base 58 which is adapted to be attached to a suitable part of the vehicle such as a fender 59.

In a rearview mirror assembly 50, adjustment indication is afforded by means comprising guide pointer fingers 60 associated with the mirror 51 by being mounted on the supporting stem 55 and coactive with suitable indicia marks 61 carried on a stationary member 62 comprising a fixed ball joint portion of the pivot joint assembly 54 attached to the pedestal 57 and within which a complementary ball joint part of the stem 55 is engaged. As a result, any adjustment of the mirror 51 is reflected in an adjustment indicating orientation of one of the plurality of guide pointers 60 with one of the series of spaced index marks 61, enabling duplication readjustment by reorienting that particular pointer with the particular index mark observed in registration when the initial adjustment has been effected.

It will, therefore, be apparent that all forms of the invention are applied to simple digitally manipulative rearview mirrors, that is, wherein the mirror is adjusted by direct manipulation thereof as distinguished from that class of mirrors in which linkages and lever arrangements are utilized enabling adjustment from within the driver's compartment or from the driver's seat by a manipulating handle or knob located in the driver's compartment of the vehicle and very little used because of the substantial costs involved in the price of the mechanisms and installation expenses.

All forms of the invention embody the simple concept of guide means coordinated in movement with the mirror registering with index means on a stationary associated part to indicate any desirable adjustment; no mechanism is involved which might get out of order or fail; exceedingly low cost is a distinct advantage; the adjustment indicator means are easily understood and require no mechanical aptitude; and duplication of adjustment settings is accomplished by quick manipulative action no different from that normally employed in making adadjustments of this kind of rearview mirror.

It will be understood that modifications and variations may be effected without departing from the spirit and scope of the novel concepts of the present invention.

I claim as my invention:

1. A rearview mirror assembly of the character described comprising:
    a pedestal having a part of a pivot structure;
    a mirror having a stem provided with pivot structure complementary to and coactive with said pedestal pivot structure to enable adjustments of the mirror by movements of the stem relative to the pedestal;
    stationary indexing marks on a part which is stationary with said pedestal behind said mirror;
    and adjustment guide pointer means carried by and movable with said stem behind said mirror and coactive with said indexing marks to afford visual indication of adjustments of the mirror relative to the pedestal.

2. A rearview mirror assembly of the character described comprising:
    a pedestal having a part of a pivot structure;
    a mirror having a stem provided with pivot structure complementary to and coactive with said pedestal pivot structure to enable adjustments of the mirror by movements of the stem relative to the pedestal;
    a housing structure fixed on said pedestal and partially enclosing said mirror;
    stationary index marks externally on said housing;
    said housing structure having an opening therein;
    and an extension from said stem projecting through said opening and having pointer means thereon externally of said housing structure and coactive with said index marks to afford visual indication of adjustments of the mirror relative to the pedestal.

3. A rearview mirror assembly according to claim 2, in which said housing structure is of streamline form tapering away from the mirror, said stem extension extends axially beyond the pivot structure to the opposite side of the pivot structure from the mirror, and said opening in the housing structure is at the smallest portion of the housing structure.

4. A rearview mirror assembly according to claim 2, in which said housing structure has said opening in the top thereof.

5. A rearview mirror assembly according to claim 1, in which said adjustment guide pointer means comprise a plurality of pointers.

6. A rearview mirror assembly according to claim 1, said indexing marks being arranged in an annular series.

7. A rearview mirror assembly according to claim 1, said pointer means comprising pointers mounted directly on said stem, said part on said pedestal comprising a ball joint housing which is the joint structure on the pedestal, and said joint structure on the mirror stem comprising a complementary ball joint element engaged in said ball joint housing.

8. A rearview mirror assembly according to claim 1, in which said marks are on a stationary dial and said guide pointer means comprise a generally star-shaped array of fingers.

References Cited

UNITED STATES PATENTS

| 2,685,859 | 8/1954 | Donnell | 116—124 |
| 3,439,646 | 4/1969 | Helle | 116—124 |

LOUIS J. CAPOZI, Primary Examiner

U.S. Cl. X.R.

248—481; 350—307